(12) United States Patent
Wu et al.

(10) Patent No.: US 9,488,868 B2
(45) Date of Patent: Nov. 8, 2016

(54) LIQUID CRYSTAL ALIGNING AGENT, LIQUID CRYSTAL ALIGNING LAYER, METHODS OF PREPARING THE SAME, AND LIQUID CRYSTAL DISPLAY PANEL

(71) Applicants: BOE TECHNOLOGY GROUP CO., LTD., Beijing (CN); BEIJING BOE DISPLAY TECHNOLOGY CO., LTD., Beijing (CN)

(72) Inventors: Jun Wu, Beijing (CN); Hongming Zhan, Beijing (CN); Chao Tian, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/429,052

(22) PCT Filed: Jul. 11, 2014

(86) PCT No.: PCT/CN2014/082008
§ 371 (c)(1),
(2) Date: Mar. 18, 2015

(87) PCT Pub. No.: WO2015/109777
PCT Pub. Date: Jul. 30, 2015

(65) Prior Publication Data
US 2016/0026042 A1 Jan. 28, 2016

(30) Foreign Application Priority Data
Jan. 21, 2014 (CN) .......................... 2014 1 0028509

(51) Int. Cl.
*G02F 1/133* (2006.01)
*C09K 19/56* (2006.01)
*G02F 1/1337* (2006.01)

(52) U.S. Cl.
CPC ......... *G02F 1/133723* (2013.01); *C09K 19/56* (2013.01)

(58) Field of Classification Search
CPC ...................................................... C09K 19/56
USPC .............................................................. 521/28
See application file for complete search history.

(56) References Cited

U.S. PATENT DOCUMENTS 5,739,885 A 4/1998 Mochizuki et al.
6,493,058 B1 12/2002 Han

FOREIGN PATENT DOCUMENTS

| CN | 101760203 A | | 6/2010 |
|---|---|---|---|
| CN | 102241990 A | * | 11/2011 |
| CN | 102626661 A | | 8/2012 |
| CN | 102828054 A | | 12/2012 |
| CN | 102850546 A | | 1/2013 |
| CN | 102863967 A | | 1/2013 |
| CN | 103820130 A | | 5/2014 |
| JP | 55-105224 A | | 8/1980 |
| JP | 55105224 A | * | 8/1980 |
| JP | 1-281419 A | | 11/1989 |
| JP | 5-107525 A | | 4/1993 |
| JP | 2002-080718 A | | 3/2002 |

OTHER PUBLICATIONS

Written Opinion of the International Searching Authority; Appln. No. PCT/CN2014/082008; Dated Oct. 21, 2014.
International Search Report Appln. No. PCT/CN2014/082008; Dated Oct. 31, 2014.
First Chinese Office Action Appln. No. 20140028509.7; Dated Mar. 4, 2015.

* cited by examiner

*Primary Examiner* — Michael M Bernshteyn
(74) *Attorney, Agent, or Firm* — Ladas & Parry LLP

(57) ABSTRACT

Provided a liquid crystal aligning agent capable of prevent liquid crystal molecules from polarization including a polyimide precursor, a cationic exchange resin and a solvent. The present invention further provides a liquid crystal aligning layer formed from the liquid crystal aligning agent, methods of preparing the liquid crystal aligning agent and the liquid crystal aligning layer, and a liquid crystal display panel including the liquid crystal aligning layer.

6 Claims, 1 Drawing Sheet

LIQUID CRYSTAL ALIGNING AGENT, LIQUID CRYSTAL ALIGNING LAYER, METHODS OF PREPARING THE SAME, AND LIQUID CRYSTAL DISPLAY PANEL

TECHNICAL FIELD

Embodiments of the present invention relates to a liquid crystal aligning agent, a liquid crystal aligning layer formed from the liquid crystal aligning agent, methods of preparing the same, and a liquid crystal display panel comprising the liquid crystal aligning layer.

BACKGROUND

Liquid Crystal Displays (LCDs) are one of electronic products having the most potential to develop in the field of displays. They have various substantive advantages including low driving voltage, low power consumption, light weight, no harmful rays, and the like. LCD display depends on different arrangements of liquid crystal molecules after anisotropic treatment of the surface film of substrate. Of those, the layer of liquid crystal molecules are the most important portion for changing the polar status of light.

During the manufacture of LCD, a minor amount of metal ions will be unavoidably introduced into the liquid crystal molecule layer due to a variety of external factors so that the polar ends of the liquid crystal molecular layer are highly easy to be absorbed by the metal ions. When the polar ends of the liquid crystal molecules are absorbed by the metal ions, the polar differences between two ends of the liquid crystal molecules will accordingly reduced. When an electric field is applied, the liquid crystal molecular layer will fail to twist because of the similar polarities at both ends so that the liquid crystal molecules are polarized to cause residual images in liquid crystal panel.

For preventing the polarization of liquid crystal molecules, the currently used methods are commonly based on circuit, i.e., incorporating a specific functional circuit into the drive circuit in the liquid crystal panel so as to prevent the metal ions in the liquid crystal molecular layer from assembling towards a single direction. However, when carrying out the aforesaid methods, the inventors find that the circuit design cannot improve fundamentally the polar difference between both ends of the liquid crystal molecules, but merely induce the twist of metal ions, and thus any abnormal power supply or abnormal controlling signing output taking place in the circuit will interrupt the twist of metal ions, and cause unavoidably the polarization of the liquid crystal molecules.

Based on the above background and demands, the present inventors develop a liquid crystal aligning agent which solves the problem of residual images in liquid crystal panels even under an electric field by means of preventing the liquid crystal molecules from polarization.

SUMMARY OF INVENTION

An embodiment of the present invention provides a liquid crystal aligning agent comprising a polyimide precursor, a cationic exchange resin, and a solvent.

Another embodiment of the present invention provides a method of preparing the liquid crystal aligning agent in accordance with the embodiments of the present invention, said method comprising:

S1: weighing a suitable amount of the polyimide precursor;

S2: adding a sufficient amount of the solvent and stirring until the polyimide precursor is thoroughly dissolved; and S3: further adding the cationic exchange resin so that it is uniformly distributed in the polyimide precursor to form the liquid crystal aligning agent.

Another embodiment of the present invention provides a liquid crystal aligning layer formed from the liquid crystal aligning agent in accordance with the embodiments of the present invention.

Another embodiment of the present invention provides a method of preparing the liquid crystal aligning layer in accordance with the embodiments of the present invention, said method comprising:

P1: coating a surface of a substrate with the liquid crystal aligning agent in accordance with the embodiments of the present invention;

P2: curing the liquid crystal aligning agent to form a layer; and

P3: rubbing the cured layer on the substrate to align the molecules so as to form the liquid crystal aligning layer.

Another embodiment of the present invention provides a liquid crystal display panel comprising the liquid crystal aligning layer in accordance with the embodiments of the present invention.

The liquid crystal aligning agent, the liquid crystal aligning layer, the methods of preparing the same, and the liquid crystal display panel provided in the embodiments of the present invention differ from the existing liquid crystal aligning agents in that the embodiments of the present invention incorporate a cationic exchange resin into the liquid crystal aligning agent. The polyimide precursor in the liquid crystal aligning agent is polymerized to long-chain molecules and cured to form a layer, and then the cured layer is subject to rubbing direction treatment to form a liquid crystal aligning layer. After that, on one hand, the cationic exchange resin incorporated into the aligning layer can be reacted with residual ions in the polyimide precursor to prevent the metal ions from moving to the liquid crystal layer when the voltage twists; and on the other hand, it further can absorb chemically metal ions carried by the liquid crystal per se so that the metal ions are bound within the resin of the aligning layer by the liquid crystal layer, thereby reducing the possibility of polarization of the liquid crystal molecules.

DETAILED DESCRIPTION OF INVENTION

Figure 1:
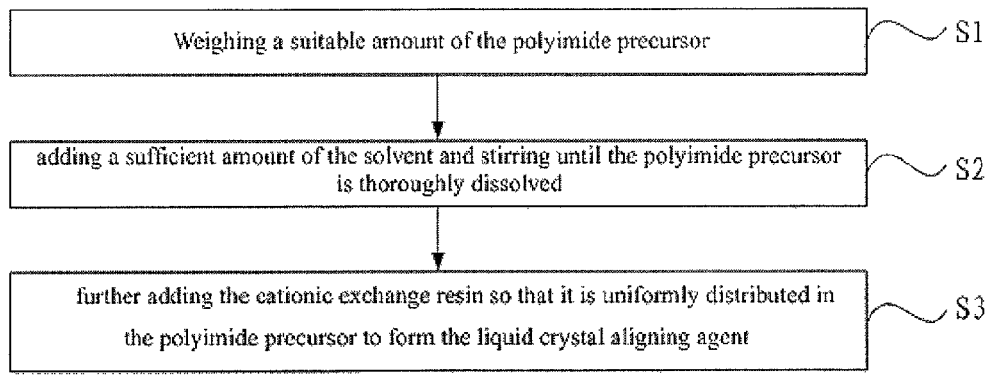
FIG. 1 indicates a flowchart of a method of preparing the liquid crystal aligning agent in accordance with the embodiments of the present invention.
Figure 2:
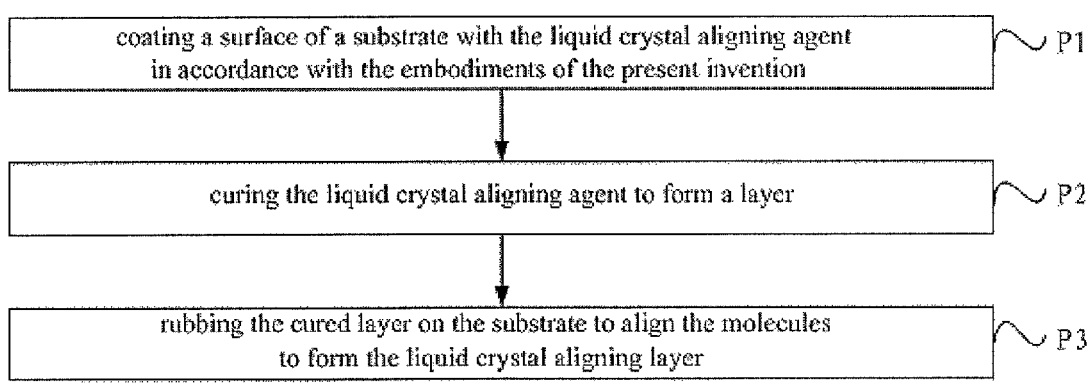
FIG. 2 indicates a flowchart of a method of preparing the liquid crystal aligning layer in accordance with the embodiments of the present invention.

Hereinafter the liquid crystal aligning agent, the liquid crystal aligning layer, the methods of preparing the same, and the liquid crystal display panel in accordance with the embodiments of the present invention are described in details with reference to the drawings.

An embodiment of the present invention provides a liquid crystal aligning agent comprising a polyimide precursor, a cationic exchange resin and a solvent.

As used herein, the term "polyimide precursor" (also known as "polyimide aligning agent") refers to a precursor solution for forming a aligning layer of the LCD, and comprises primarily polyimide (PI)-based compounds, additional monomer(s), and a solvent. The monomers may be any monomer suitable for use in a polyimide precursor as known in the art, such as, pyromellitic dianhydride (PMDA), 2,2-bis[4-(4-aminophenoxy)phenyl]propane (BAPP), 1,2,4,5-cyclohexanetetracarboxylic acid dianhydride (hydrogenated PMDA), p-phenylenediamine, and the like, and preferably PMDA and p-phenylenediamine. The solvent may be any solvent suitable for use in a polyimide precursor as known in the art, such as, N-methylpyrrolidone (NMP), dimethylacetamide (DMA), and the like. The PI-based compounds may be a reaction product of an aromatic diamine with an aromatic tetracarboxylic acid or its anhydride or ester derivative, and have generally a molecular weight between 30,000 and 100,000. In the embodiments of the present invention, the suitable aromatic diamine may be p-phenylenediamine or he like, and the suitable aromatic tetracarboxylic acid or its anhydride or ester derivative may be PMDA or the like. The PI-based compounds suitable for use in the embodiments of the present invention may be synthesized in accordance with any method as known by persons skilled in the art, or can be any suitable commercially available products. For instance, the PI-based compounds may be prepared by: reacting an aromatic diamine with an aromatic tetracarboxylic acid or its anhydride or ester derivative in a solvent (such as, N-methylpyrrolidone, etc.) to generate a polyimide acid, which is subject to thermal dehydration to produce a polyimide. The commercially available PI-based compounds suitable for use in the embodiments of the present invention may be SE-4110, SE-150, SE-610, etc. as manufactured by Nissan Inc. The polyimide precursor has relatively high thermal resistance, compatibility to liquid crystal, mechanical strength, and good electric properties. It can be used in most of liquid crystal display panels to prevent any film peeling or rubbing damage caused during post-filmforming rubbing operation.

As used herein, the term "cationic exchange resin" refers to an insoluble high molecular weight compound having exchangeable cations and a net-like structure. The cationic exchange resin is mostly prepared in accordance with organic synthesize methods by using commonly styrene or acrylic acid/acrylates as starting materials. Such starting materials are subject to polymerization to form a backbone having three dimensional network structure, and then various types of chemically active groups (typically acidic groups) are introduced onto the backbone to produce the desired resin. The cationic exchange resin comprises one (or more) chemically active group, which can be dissociated in water to release certain cations, while absorbing other cations originally present in the solution. The cationic exchange resin comprises primarily styrene-based and acrylics-based, and moreover it can also be prepared by polymerization of other organic monomers, such as, phenol-aldehyde-based, epoxy-based, vinylpyridine-based, urea formaldehyde-based, and the like. In the embodiments of the present invention, a cationic exchange resin is incorporated into the polyimide precursor. After the polyimide precursor is polymerized and cured to form a layer and then subject to rubbing direction, the cationic exchange resin may chemically absorb metal ions present in the polyimide precursor or the liquid crystal layer to reduce the possibility of polarization of liquid crystal.

The cationic exchange resin suitable for use in the embodiments of the present invention may be, e.g., a polystyrene (PS)-based cationic exchange resin conforming to the structural general formula (I) of:

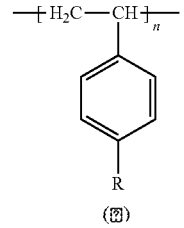

wherein R is an acidic group, n is a degree of polymerization and in a range of 10 to 50, i.e., the repeating group of the aforesaid polymer is $-[CH_2CH(C_6H_4R)]-$. In an aspect, R may be one selected from the group consisting of $-SO_3H$, $-COOH$ or $-COSH$. The polystyrenesulfonic acid (PSSa) cationic exchange resin conforming to the aforesaid structural general formula may have a molecular weight of about 184*n (wherein n is a degree of polymerization), a density of 0.7-0.9 g/ml, and an ion exchange equivalent of 0.7 to 4.2 mmol/g.

For simplicity, the group of

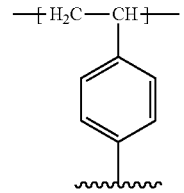

in the aforesaid repeating group is marked as X group.

When R is $-SO_3H$, the aforesaid cationic exchange resin is a PSSa-based highly-acidic cationic resin which comprises a large amount of highly-acidic groups and is likely to releasing W in the liquid crystal layer to present highly acidic property. At that time, the cationic exchange resin may undergo a displacement reaction with most of metal ions in the liquid crystal molecular layer in accordance with the chemical equations of:

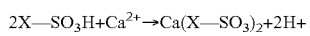
$$2X-SO_3H+Ca^{2+} \rightarrow Ca(X-SO_3)_2+2H+$$

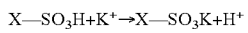
$$X-SO_3H+K^+ \rightarrow X-SO_3K+H^+$$

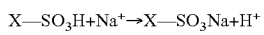
$$X-SO_3H+Na^+ \rightarrow X-SO_3Na+H^+$$

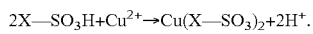
$$2X-SO_3H+Cu^{2+} \rightarrow Cu(X-SO_3)_2+2H^+.$$

When the resin is dissociated, the negatively charged group contained in the bulk of resin can absorb other cations (e.g., metal ions) in the solution.

When R is $-COOH$ or $-COSH$, the aforesaid cationic exchange resin is a PS-based weakly acidic cationic resin which comprises a large amount of weakly acidic group and is likely to releasing $H^+$ in the liquid crystal layer to present highly acidic property. In comparison, X—COOH is relatively weakly acidic, and may only undergo a displacement reaction with weakly basic metal ions in the liquid crystal molecular layer in accordance with the chemical equations of:

$$2X-COOH+Ca^{2+}\rightarrow Ca(X-COO)_2+2H^+$$

$$2X-COOH+Mg^{2+}\rightarrow Mg(X-COO)_2+2H^+$$

$$2X-COOH+Cu^{2+}\rightarrow Cu(X-COO)_2+2H^+.$$

Moreover, the acidity of X—COSH is weaker than —SO$_3$H, but slightly higher than —COOH. In addition to the weakly basic metal ions in the liquid crystal layer, X—COSH can further undergo a displacement reaction with those having slightly higher basicity in line with the chemical equations of:

$$2X-COSH+Ca^{2+}\rightarrow Ca(X-COS)_2+2H^+$$

$$2X-COSH+Mg^{2+}\rightarrow Mg(X-COS)_2+2H^+$$

$$2X-COSH+Cu^{2+}\rightarrow Cu(X-COS)_2+2H^+$$

$$X-COSH+Na^+\rightarrow X-COSNa+H^+.$$

When the resin is dissociated, the remained negatively charged group can be bonded with other cations (e.g., metal ions) in the solution via absorption, but the basicity of such resins are relatively weak in general.

It is to be understood by persons skilled in the art that the aforesaid PS-based cationic exchange resins are only examples suitable for use as the cationic exchange resin of the present invention, while other suitable cationic exchange resins can also be used in the present invention.

The solvent suitable for use in the embodiments of the present invention may be one or more selected from the group consisting of N-METHYL-2-PYRROLIDONE, γ-butyrolactone, dimethylformamide, dimethylacetamide, tetrafuran and butoxyethanol.

The embodiments of the present invention differs from the existing liquid crystal aligning agents in that a cationic exchange resin is added into the liquid crystal aligning agent. The polyimide precursor in the liquid crystal aligning agent is polymerized to long-chain molecules and cured to form a layer, and then the cured layer is subject to rubbing direction treatment to form a liquid crystal aligning layer. After that, on one hand, the cationic exchange resin incorporated into the aligning layer can be reacted with residual ions in the polyimide precursor to prevent the metal ions from moving to the liquid crystal layer when the voltage twists; and on the other hand, it further can absorb chemically metal ions carried by the liquid crystal per se so that the metal ions are bound within the resin of the aligning layer by the liquid crystal layer, thereby reducing the possibility of polarization of the liquid crystal molecules.

Moreover, for improving the protection of the polar end of liquid crystal molecules, the density of the cationic exchange resin in the liquid crystal aligning agent in accordance with the embodiments of the present invention may be less than the polyimide precursor. As a result, the cationic exchange resin may be suspended in the liquid crystal aligning agent, and is better able to form a stable suspension system, together with the long-chain molecules formed by polymerization of the polyimide precursor through its three dimensional netlike structure, so as to ensure that the cationic exchange resin is better able to absorb chemically the metal ions in the polyimide precursor or the liquid crystal layer after the suspension system is cured to form the liquid crystal aligning layer.

In a further embodiment of the present invention, the polyimide precursor, cationic exchange resin and the solvent may be, respectively:
the polyimide precursor: 20-40 parts by weight;
the cationic exchange resin: 1-3 parts by weight; and
the solvent: 160-200 parts by weight.

At such ratio, the cationic exchange resin is better able to suspend in the long chain molecules formed by polyimide precursor so as to ensure that the cationic exchange resin is better able to absorb the ions in the liquid crystal. Moreover, it is to be indicated that the cationic exchange resin per se has stable chemical and physical properties, and thus would neither affect the liquid crystal alignment or arrangement, nor twists under an electric field.

Another embodiment of the present invention provides a method of preparing the liquid crystal aligning agent comprising:

S1: weighing a suitable amount of the polyimide precursor;

S2: adding a sufficient amount of the solvent and stirring until the polyimide precursor is thoroughly dissolved; and S3: further add the cationic exchange resin so that it is uniformly distributed in the polyimide precursor so as to produce the liquid crystal aligning agent.

In S1, the polyimide precursor may be 20-40 parts by weight, preferably 25 parts by weight.

In S2, the solvent may be, e.g., a mixture of initiation solvent and dissolution solvent wherein the initiation solvent may be a mixture of N-methyl-2-pyrrolidone and γ-butyrolactone, and the dissolution solvent may be butoxyethanol. Of those, N-methyl-2-pyrrolidone may be 20-35 parts by weight, and γ-butyrolactone may be 120-140 parts by weight, and butoxyethanol may be 20-25 parts by weight. Preferably, N-methyl-2-pyrrolidone may be 24-30 parts by weight, γ-butyrolactone may be 125-135 parts by weight, and butoxyethanol may be 22-24 parts by weight. Still preferably, N-methyl-2-pyrrolidone may be 27 parts by weight, γ-butyrolactone may be 130 parts by weight, and butoxyethanol may be 23 parts by weight.

In S3, the cationic exchange resin may be 1-3 parts by weight, preferably 3 parts by weight. It is to be understood that persons skilled in the art can select the particular amount of the cationic exchange resin within the aforesaid range in accordance with the concentration of metal ions contained in the liquid crystal layer.

Moreover, the aforesaid S1 to S3 may be carried out at a temperature of room temperature to 60° C. and under a protective atmosphere. The temperature is preferably room temperature. The protective atmosphere may be nitrogen or argon, preferably nitrogen. Preferably, the aforesaid S1 to S3 are carried out under anhydrous conditions.

The above described method of preparing the liquid crystal aligning agent are simple and easy. Moreover, the liquid crystal aligning agent prepared thereby can reduce effectively the possibility of polarization of liquid crystal molecules, avoid the occurrence of residual images in the display image of the liquid crystal display panel, thereby improving the performance of the liquid crystal aligning layer.

Another embodiment of the present invention provides a liquid crystal aligning layer formed from the liquid crystal aligning agent in accordance with the embodiments of the present invention. Due to the incorporation of a cationic exchange resin into the liquid crystal aligning agent in accordance with the embodiments of the present invention, the cationic exchange resin can form, via its three dimensional netlike structure, a more stable composite structure, together with the long chain molecules formed by polymerization and curing of the polyimide precursor, thereby reducing the possibility of polarization of liquid crystal molecules. The liquid crystal aligning layer formed by the liquid crystal aligning agent in accordance with the embodiments of the present invention may effectively avoid the polarization of liquid crystal molecules, thereby improving the performances of the liquid crystal aligning layer.

Another embodiment of the present invention provides a method of preparing the liquid crystal aligning layer comprising:

P1: coating a surface of a substrate with the liquid crystal aligning agent in accordance with the embodiments of the present invention;

P2: curing the liquid crystal aligning agent to form a layer; and

P3: rubbing the cured layer for direction, so as to form the liquid crystal aligning layer.

In P1, the liquid crystal aligning agent may have a coating thickness of 700 to 1200 Å.

In P2, the curing may comprise a pre-baking in an oven at a temperature of 80 to 150° C. (preferably 120° C.) for 50 to 200 seconds (preferably 130 to 150 seconds), followed by a primary baking at temperature of 180 to 240° C. (preferably 220° C.) for 12,000 seconds.

In P3, the rubbing direction may be carried out in a horizontal direction or an angled direction. For instance, a horizontal rubbing direction is used for CF and TFT liquid crystal displays with ADS display mode, while a 45° rubbing direction is used for CF and TFT liquid crystal displays with TN mode.

The aforesaid P1 and P3 may be carried at a temperature of room temperature to 75° C. and under a protective atmosphere, preferably at room temperature and under nitrogen protective atmosphere, so as to avoid introduction of other impurities and decomposition of liquid crystal at elevated temperature.

The above-prepared liquid crystal aligning layer may effectively prevent occurrence of polarization of liquid crystal molecular layer, and further prevent the occurrence of residual images in display images. The method is simply and easy to operate, and may effectively improve the display performance of the liquid crystal display panel.

Another embodiment of the present invention provides a liquid crystal display panel comprising the liquid crystal aligning layer in accordance with the embodiments of the present invention. Since the liquid crystal aligning layer may effectively avoid the occurrence of polarization of liquid crystal, the use of such liquid crystal aligning layer in liquid crystal display panel may prevent the occurrence of residual images in the liquid crystal display panel, and improve effectively the display performance of the liquid crystal display panel.

For illustrating the liquid crystal aligning agent in accordance with the embodiments of the present invention more detailedly, the liquid crystal aligning layer, the method of preparing the same, and the liquid crystal display panel are described hereinafter with reference to the examples.

EXAMPLES

It is to be understood by persons skilled in the art that the cationic exchange resin is described in details with an example of PS-based cationic exchange resins in the present specification, but the cationic exchange resin used in the embodiments of the present invention is not limited to the PS-based cationic exchange resin. The ionic exchange resin may also be prepared by polymerization of other organic monomers, such as, acrylics/acrylates, phenol-aldehydes, epoxys, vinylpyridines, urea aldehydes, and the like, as long as it can have cationic exchange effect, absorb metal ions, and reduce the possibility of polarization of liquid crystal.

Example 1

Preparation of Liquid Crystal Aligning Agent 1

At room temperature, 20 parts by weight of polyimide precursor (Nissan SE-6414) was weighed. Then, 20 parts by weight of N-methyl-2-pyrrolidone, 120 parts by weight of γ-butyrolactone and 20 parts by weight of butoxyethanol were added into the precursor, and stirred until the polyimide precursor was thoroughly dissolved. Next, 1 part by weight of polystyrene sulfonic acid cationic exchange resin was added and stirred to homogeneous, so as to form the liquid crystal aligning agent 1.

Of those, the used polystyrene sulfonic acid cationic exchange resin conforms to the chemical structural formula of:

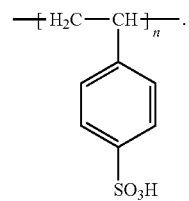

wherein the polystyrene sulfonic acid cationic exchange resin has a molecular weight of 184*n, and wherein n is the polymerization degree, and in this example the value of n is 30. The cationic exchange resin has a density of 0.8 g/ml, and an ionic exchange equivalent of 3 mmol/g.

Preparation of Liquid Crystal Aligning Layer 1

The above-prepared liquid crystal aligning agent 1 was applied onto the surface of a glass substrate (8.5 generation line glass having a dimension of 2.2 m×2.5 m and a thickness of 0.7 mm) with a coating thickness of 1200 Å. Then, the liquid crystal aligning agent 1 was cured to form a layer by a pre-baking in an oven at 120° C. for 130 seconds, followed by a primary baking at 200° C. for 12,000 seconds. The so-cured layer was subject to horizontal rubbing direction, so as to form the liquid crystal aligning layer 1.

Example 2

Preparation of Liquid Crystal Aligning Agent 2

At room temperature, 30 parts by weight of polyimide precursor (Nissan SE-6414) was weighed. Then, 27 parts by weight of N-methyl-2-pyrrolidone, 130 parts by weight of γ-butyrolactone, and 23 parts by weight of butoxyethanol were added to the precursor, and stirred until the polyimide precursor was thoroughly dissolved. Then, 2 parts by weight of polystyrene carboxylic acid exchange resin was added and stirred to homogeneous, so as to form the liquid crystal aligning agent 2.

Of those, the used polystyrene carboxylic acid cationic exchange resin conforms to the chemical structural formula of:

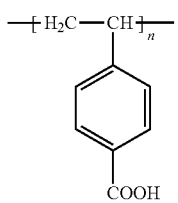

wherein the polystyrene carboxylic acid cationic exchange resin has a molecular weight of 148*n, and wherein n is the polymerization degree, and in this example the value of n is 30. The cationic exchange resin has a density of 0.85 g/ml, and an ionic exchange equivalent of 2.5 mmol/g.

Preparation of Liquid Crystal Aligning Layer 2

The above-prepared liquid crystal aligning agent 2 was applied onto the surface of a glass substrate (8.5 generation line glass having a dimension of 2.2 m×2.5 m and a thickness of 0.7 mm) (with a thickness of 1200 Å). Then, the liquid crystal aligning agent 2 was cured to form a layer by a pre-baking in an oven at 120° C. for 150 seconds, followed by a primary baking at 220° C. for 12,000 seconds. The so-cured layer was subject to horizontal rubbing direction, so as to form the liquid crystal aligning layer 2.

Example 3

Preparation of Liquid Crystal Aligning Agent 3

At room temperature, 40 parts by weight of polyimide precursor (Nissan SE-6414) was weighed. Then, 35 parts by weight of N-methyl-2-pyrrolidone, 140 parts by weight of γ-butyrolactone, and 25 parts by weight of butoxyethanol were added into the precursor, and stirred until the polyimide precursor was thoroughly dissolved. Then, 3 parts by weight of poly(vinylbenzothioic S-acid) cationic exchange resin was added and stirred to homogeneous, so as to form the liquid crystal aligning agent 3.

Of those, the poly(vinylbenzothioic S-acid) cationic exchange resin conforms to the chemical structural formula of:

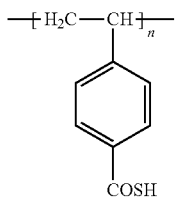

wherein the poly(vinylbenzothioic S-acid) cationic exchange resin has a molecular weight of 164*n, wherein n is the polymerization degree, and in this example the value of n is 30. The cationic exchange resin has a density of 0.9 g/ml, and an ionic exchange equivalent of 2 mmol/g.

Preparation of Liquid Crystal Aligning Layer 3

The liquid crystal aligning agent 3 was applied onto the surface of a glass substrate (8.5 generation line glass having a size of 2.2 m×2.5 m and a thickness of 1200 Å). Then, the liquid crystal aligning agent 3 was cured to form a layer by a pre-baking in an oven at 120° C. for 140 seconds, followed by a primary baking at 220° C. for 12,000 seconds. The so-cured layer was subject to horizontal rubbing direction, so as to form the liquid crystal aligning layer 3.

Example 4

Preparation of Liquid Crystal Display Panel Having Liquid Crystal Aligning Layer Four pieces of small-sized liquid crystal display panel having thin-film-free transistor was prepared with a dimension of 10 mm*10 mm. An existing common liquid crystal aligning agent excluding any cationic exchange resin (control) and the liquid crystal aligning agents 1 to 3 prepared in accordance with Examples 1 to 3 were applied onto the four liquid crystal display panels by spin coating method, respectively. The coating conditions comprised using excessive liquid crystal aligning agent for spin coating, wherein the coating rate was raised to 800 r/min over 5 seconds, kept for 10 seconds, raised to 1600 r/min over 5 seconds, and then kept for 20 seconds. The liquid crystal aligning agent was baked at 180° C. for 30 min so that the liquid crystal aligning agent was cured to form a film layer having a thickness of 1200 Å. Then, the so-formed cured film layer of liquid crystal aligning agent was subject to horizontal rubbing direction, so as to form liquid crystal display panels A, B, C, and D having A liquid crystal aligning layer.

Example 5

Test of Performances

The liquid crystal display panels A, B, C, and D prepared in accordance with Example 4 were tested with the FPD Measurement System 6254 manufactured by Toyo Corporation China, respectively. A small-sized liquid crystal cell was used for testing the current in the cell by applying different frequencies and different voltages on the upper and lower ITO extrudes in the cell, and then for testing (1) Ion Density (ID); and (2) Residual Direct Current and Voltage Holding Rate (VHR) by software calculation. In accordance with the measurement, the metal ion concentration in the liquid crystal display panel was calculated. The results were listed in Table 1.

TABLE 1

| Metal ion concentration in the Liquid Crystal Display Panel | | | | |
|---|---|---|---|---|
| | Liquid Crystal Display Panel | | | |
| | A | B | C | D |
| The used liquid crystal aligning agent | Control | Liquid crystal aligning agent 1 | Liquid crystal aligning agent 2 | Liquid crystal aligning agent 3 |
| Metal ion concentration (pC) | 32 | 21 | 22 | 24 |

Figure 3:
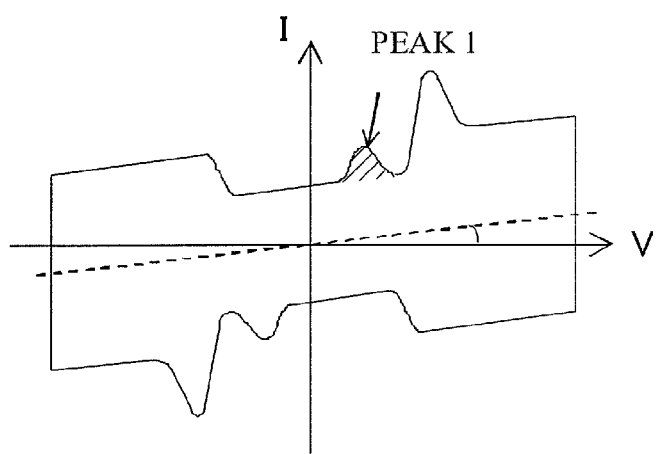
FIG. 3 indicates a schematic drawing for testing the metal ion concentrations in the liquid crystal panel in accordance with the embodiments of the present invention under an electric field.

As shown in FIG. 3, positive and negative voltages were applied onto the liquid crystal display panel. After the current in the liquid crystal panel was stably output, symmetrical patterns were maintained at the positive side and the negative side. Initially, the current in the liquid crystal display panel kept stable upon outputting. After a period of time it showed a remarked decreasing, and the decreased current continued to keep stable. After a further period of time, a minor variation of current appeared, that is, the diagonal area as shown by Peak 1. The area of Peak 1 was calculated so as to give the metal ion concentration in the liquid crystal display panel. As shown, the metal ion concentrations of A, B, C, and D were 32 pC, 21 pC, 22 pC, and 24 pC, respectively.

It can be seen from Table 1 above that the liquid crystal display panels having the liquid crystal aligning layer formed by the liquid crystal aligning agent comprising a cationic exchange resin in accordance with the embodiments of the present invention have substantially lower metal ion concentration as compared with the metal ion concentration in the liquid crystal display panels in which the liquid crystal aligning layer does not comprise any cationic exchange resin.

It is due to the incorporation of a cationic exchange resin into the liquid crystal aligning agent prepared in accordance with the examples of the present invention. The cationic exchange resin may form a stable suspension system, together with the long-chain molecules formed by polymerization of the polyimide precursor through its three dimensional netlike structure, and thus can be better able to absorb chemically the metal ions present in the polyimide precursor or the liquid crystal layer. It can not only prevent the metal ions from transferring to the liquid crystal layer when the voltage shifts, but also bind the metal ions of the liquid crystal layer within the resin of the aligning layer. Thus, it reduces the possibility of occurrence of polarization of the liquid crystal, thereby improve substantially the display performance of the liquid crystal display panel.

It is apparent that the above-listed examples are provided for describing the invention more clearly, instead of limiting the invention in any manner. Persons skilled in the art may make other various modification or variation based on the above description. It cannot and need not list all the embodiments exhaustively. Any apparent modification or variation extended therefrom are still encompassed by the scope of the present invention.

We claim:

1. A liquid crystal aligning agent comprising a polyimide precursor, a cationic exchange resin and a solvent, wherein the cationic exchange resin conforms to the structural general formula (I) of:

wherein R is an acidic group, and n is 10 to 50, wherein the liquid crystal aligning agent comprises:
the polyimide precursor 20-40 parts by weight;
the cationic exchange resin: 1-3 parts by weight; and
the solvent: 160-200 parts by weight.

2. The liquid crystal aligning agent of claim 1 wherein the R is one selected from the group consisting of —$SO_3H$, —COOH and —COSH.

3. The liquid crystal aligning agent of claim 1 wherein the cationic exchange resin has a less density as compared to the polyimide precursor.

4. The liquid crystal aligning agent of claim 1 wherein the solvent is one or more selected from the group consisting of N-methyl-2-pyrrolidone, γ-butyrolactone, dimethylformamide, dimethylacetamide, tetrafuran and butoxyethanol.

5. A liquid crystal aligning layer formed from the liquid crystal aligning agent of claim 1.

6. A liquid crystal display panel comprising the liquid crystal aligning layer of claim 5.

* * * * *